MULTI-PROCESSOR MULTI-PROGRAMED COMPUTER SYSTEM

Filed July 5, 1966 3 Sheets-Sheet 1

INVENTOR.
ANDREW T. LING
BY
Carl V. Olson
Attorney

MULTI-PROCESSOR MULTI-PROGRAMED COMPUTER SYSTEM

Filed July 5, 1966 3 Sheets-Sheet 2

INVENTOR.
ANDREW T. LING
BY
Carl V. Olson
Attorney

INVENTOR.
ANDREW T. LING
BY
Carl V. Olson
Attorney

United States Patent Office 3,566,357
Patented Feb. 23, 1971

3,566,357

MULTI-PROCESSOR MULTI-PROGRAMED COMPUTER SYSTEM

Andrew T. Ling, Collingswood, N.J., assignor to RCA Corporation, a corporation of Delaware Filed July 5, 1966, Ser. No. 562,639
Int. Cl. G06f *9/18, 15/16*
U.S. Cl. 340—172.5 4 Claims

ABSTRACT OF THE DISCLOSURE

A computer system including at least two processors having access to a main memory, a plurality of sets of program execution registers for use in the execution of respective programs, and a controller. The controller supervises the connections between the processors and the sets of program execution registers to keep the processors most efficiently utilized in successively executing parts of a number of programs stored in the main memory.

This invention relates to computer systems, and particularly to a multi-processor multi-programed computer system.

A multi-processor computer system is one including a plurality of simultaneously operative computer processor units each having access to a common main memory, or having access to each other's main memory. A multi-programed computer system is one in which a plurality of programs are stored in the main memory, and the computer processor automatically switches from the execution of one program to the execution of another program. The switching is done to keep the processor fully occupied, rather than sometimes idle waiting for input-output or other functions to be performed.

When a computer processor switches from the performance of an uncompleted program, intermediate results and other status information must be stored for use when execution of the interrupted program is resumed. The time required to switch from one program to another is minimized if sets of registers are provided for each of the several programs. When the processor is executing a program, it is connected to and uses the set of registers assigned to that program. When the processor switches to a second program, it merely reconnects itself to, and uses, the set of registers assigned to the second program.

It is a general object of this invention to provide an improved computer system which combines the advantages of a multi-processor system and a multi-programed system including a plurality of sets of registers for a plurality of programs.

It is another object to provide an improved computer system including a plurality of processors, a plurality of sets of program execution registers, and a controller for controlling the connections of all processors with appropriate ones of the sets of program execution registers.

It is a further object to provide an economical, reliable and efficient computer system in which at least two processors are each constructed to most economically execute a different kind of program, and in which each processor is automatically employed to execute both kinds of programs should the other processor fail.

It is yet another object to provide an improved computer system in which a first processor is normally connected with a set of executive program execution registers, and in which a second processor is normally connected with a set of production program execution registers, and in which a controller automatically controls changed connections of processors and sets of registers in accordance with needs and availabilities.

In accordance with a specific example of the invention, there is provided a multi-processor multi-program computer system including a plurality of computer processors all having access to a main memory and each including an interrupt facility responding appropriately to various interrupt request conditions. A plurality of sets of program execution registers are provided for a respective plurality of programs including at least one user's production program and at least one executive program. The contents of a program-set-identifying register associated with each processor controls first gates to operationally connect the processor with the identified set of program execution registers. An interrupt-pending indicator and an in-use indicator is provided for each set of program execution registers. Second gates are also controlled by the contents of the program-set-identifying registers associated with each processor to couple signals from each processor to thereby-identified ones of the interrupt-pending and in-use indicators. A first or interrupted processor selector selects a processor in response to an interrupt request from the processor, the first selector being operative to permit the selected processor to discontinue operating with the set of program execution registers then connected therewith, and to update the corresponding interrupt-pending and in-use indicators. A second or interrupted set selector is responsive to the contents of the interrupt-pending indicators to generate the address of the highest priority set of program execution registers having an interrupt pending. A third or executive set selector selects a set of executive program execution registers. A fourth or executive processor selector selects or does not select a processor to operate as an executive processor, the fourth selector being operative to select a processor having a predetermined priority for selection, and an output from any interrupt-pending indicator. The selected processor ends its interrupt status, transfers the address from the second selector to the program-set-identifying register associated with the processor, updates the corresponding interrupt-pending and in-use indicators, extracts needed information from the set of program execution registers selected by the second selector, and then transfers the address from the third selector to the program-set-identifying register associated with the processor, whereby the selected processor is permitted to proceed with the performance of the executive program. A fifth or idle set selector is operative in the event that a processor is not selected by the fourth selector. The fifth selector compares the contents of the in-use indicators with the contents of the program-set-identifying register associated with the processor, and inserts the identifying address of a selected idle set of program execution registers into the program-set-identifying register associated with the processor, whereby the processor is permitted to proceed with the performance of a user's production program.

Figure 1:
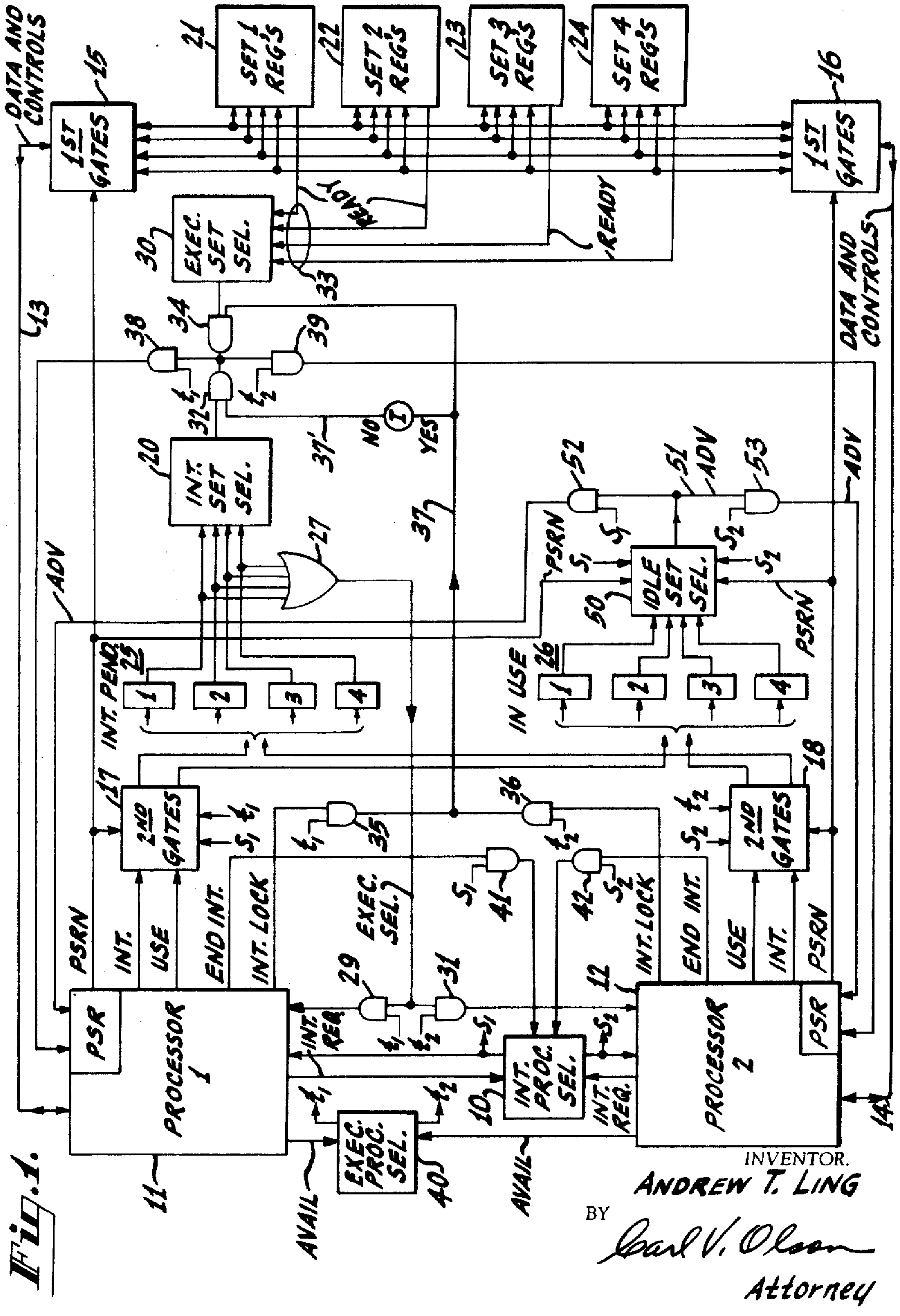
FIG. 1 is a block diagram of a computer system constructed according to the teachings of the invention.

Referring now in greater detail to FIG. 1, there is shown a computer system including a first computer processor 11 and a second computer processor 12. Each computer processor is connected by a respective data and control signal bus 13 and 14 and through respective first gates 15 and 16 to a plurality of sets of program execution registers 21, 22, 23 and 24. Each set of program execution registers contains storage locations for intermediate results and status information concerning a respective assigned program. Each set of program execution registers may include a system control register and many general and utility registers. One or more of the sets of program execution registers may be assigned to the performance of executive, supervisory and input-output programs. Others of the sets of program execution registers may be assigned to a respective plurality of users' production programs.

Each computer processor uses one set of program execution registers at any one time in the execution of a corresponding program. The other processor may, at the same time, employ another set of program execution registers for the performance of another corresponding program. Each processor may be connected with any one of the sets of registers. Each set of registers, for example, may consist of many individual flip-flop circuits for storing many corresponding bits of information, and also means for accessing any desired ones of the flip-flop registers in the set. On the other hand, the sets of program execution registers may consist of storage locations in a high-speed scratch pad memory including means for accessing any desired storage locations in the memory.

Each computer processor 11 and 12 has access to a common main memory (not shown), or each processor contains its own main memory and also has access to the main memory of the other processor. Each processor includes a program set register PSR for containing a number or address identifying the one of the sets of program execution registers 21 through 24 with which the processor is or will be connected for the execution of a program. Each program-set-identifying register PSR has an output number or address PSRN which is connected to a respective first gate 15 or 16 to effect a connection of data and controls over bus 13 or 14 between a processor and an identified one of the sets of registers 21 through 24.

Each processor 11 and 12, when operative (not disabled), supplies an output AVAIL to an executive processor selector 40. The selector 40 has an output $t_1$ for the tentative selection of processor 11, and an output $t_2$ for the tentative selection of processor 12.

Each processor 11 and 12 has an interrupt request output INT REQ connected to an interrupted processor selector 10. Selector 10 has an output $s_1$ for selecting processor 11, and an output $s_2$ for selecting processor 12.

Each processor 11 and 12 has an interrupt pending output INT and an in-use output USE connected to respective second gates 17 and 18. Second gates 17 and 18 also receive the program set identifying number over line PSRN from the register PSR in the respective processor. The second gates 17 and 18 direct an interrupt signal INT from a respective processor to a one of the four interrupt pending indicator flip-flops 25 determined by the number on line PSRN. Similarly, second gates 17 and 18 direct in-use signals USE from the processors to a one of the four indicator flip-flops 26 determined by the number on line PSRN. To summarize, the second gates 17 and 18 steer "set" and "reset" signals from the processors to the interrupt pending indicator flip-flops 25 and to the in-use indicator flip-flops 26.

The interrupt pending indicator flip-flops 25 have outputs connected through an "or" gate 27 which provides an output EXEC SEL whenever there is an interrupt pending indicated by any one or more of the indicator flip-flops 25. The signal EXEC SEL is coupled to the processors by gates 29 and 31 under the control of selector signals $t_1$ and $t_2$.

The outputs of the interrupt pending indicator flip-flops 25 are also connected to an interrupt set selector 20. Selector 20 has an output connected to gates 32 which indicates the number or address of a selected one of the sets of program execution registers having an interrupt pending. The selector 20 may include means for selecting a set of registers on the basis of a pre-assigned priority.

At least one of the sets of program execution registers 21 through 24 is assigned for use with an executive program and has a ready output 33 connected to an executive set selector 30. The output of selector 30 is applied to gates 34 and is a number or address identifying a selected one of the sets of registers which are ready. The selector 30 may be constructed to always select a predetermined one of the sets of registers, or to select a set of registers based on a predetermined priority, or to select a set of registers based on information stored in the sets of registers.

Each processor includes an interrupt lock indicator flip-flop (not shown) having an output INT LOCK coupled through respective gates 35 or 36 and over a line 37 to gates 34. The line 37 is also connected through an inverter I to gates 32. The interrupt lock signal on line 37 and the inverted interrupt lock signal on line 37' determine whether the selector 20 acting through gates 32, or the selector 30 acting through gates 34, will supply the number of a selected set of program execution registers through gates 38 or gates 39 to the program set register PSR in processor 11 or processor 12.

Each processor 11 and 12 has an end interrupt output END INT connected through a respective gate 41 or 42 to the interrupted processor selector 10. And end interrupt signal thus applied to selector 10 causes the selector to discontinue its selection output $s_1$ or $s_2$.

The outputs of the in-use indicator flip-flops 26 are connected to an idle set selector 50. The selector 50 also has inputs PSRN from respective registers PSR in processors 11 and 12. Selector 50 compares the program set registers number supplied to it with the outputs of the in-use indicator flip-flops 26 to determine whether the set having the number or address PSRN is already in use. If so, selector 50 issues an advance signal ADV on line 51 which is passed by a gate 52 or a gate 53 to increment the number in the program set register PSR of the corresponding processor 11 or 12. Selector 50 then again makes the comparison. When the comparison indicates that the number in register PSR corresponds with the number of an idle set of program execution registers, the selector 50 completes its selection by not issuing an advance signal on line 51.

To summarize, FIG. 1 shows a computer system including, by way of example, two processors 11 and 12, and four sets of program execution registers 21, 22, 23 and 24. The remainder of the units in FIG. 1 constitute a controller for controlling connections via buses 13 and 14 between the processors and the sets of program execution registers.

A detailed description of the construction and operation of a single processor and a plurality of sets of program execution registers is contained in application Ser. No. 448,708 filed on April 16, 1965, by the present inventor, now Pat. No. 3,373,408 issued on Mar. 12, 1968, and entitled "Computer Capable of Switching Between Programs Without Storage and Retrieval of the Contents of Operation Registers."

All of the units in FIG. 1 constituting the controller perform simple described functions. The units easily may be constructed from elemental logic gates such as "and" gates, "nand" gates, "or" gates, "nor" gates, flip-flops, comparators, etc., by a person skilled in the art following conventional design practices.

Figure 3:
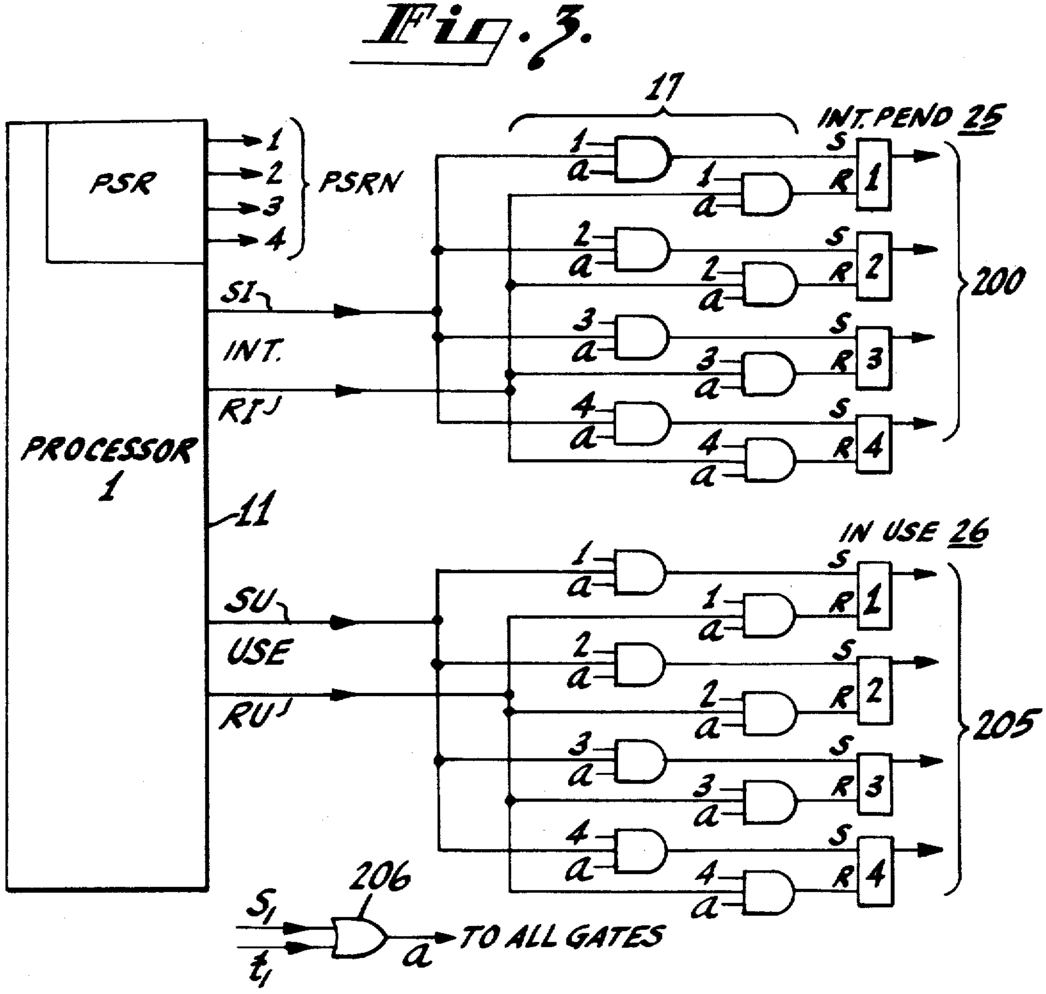
FIG. 3 is a diagram showing details of a gating arrangement in the system of FIG. 1.

For example, the second gates 17 may be constructed and connected between the processor 11 and flip-flops 25 and 26 in the manner illustrated in FIG. 3. The program set register PSR in the processor provides an output number identifying one of the sets of program execution registers. The number PSRN may be conveyed by energization of one of the lines 1 through 4. The output 1 is connected to gates at the set and reset inputs of the first one of the interrupt pending flip-flops 25, and is connected to gates at the set and reset inputs of the first one of the in-use flip-flops 26. Outputs 2, 3 and 4 from the register PSR are similarly connected to respective gates at the inputs of other interrupt pending and in-use flip-flops. According to an alternative and more economical arrangement, the program set register PSR may be a two-bit register, and the number PSRN may be a binary coded number 00, 01, 10 or 11 which is carried on two lines to identify any particular one of the four sets of program execution registers. In such an alternative arrangement, a decoder may be interposed between the register PSR and the gates 17.

The interrupt output INT from the processor 11 in FIG. 3 consists of an interrupt set line SI and an interrupt reset line RI. The input set line SI is connected to all four of the "and" gates at set inputs of the four interrupt pending flip-flops 25. The interrupt reset line RI is connected to all four of the "and" gates at the reset inputs of the four interrupt pending flip-flops 25. The outputs 200 from the interrupt pending flip-flops 25 are connected as shown in FIG. 1 to the interrupt set selector 20 and the "or" gate 27.

The in-use output USE from processor 11 consists of a set use line SU and a reset use line RU. The set use line SU is connected to all four of the "and" gates at set inputs of all four in-use flip-flops 26. The reset use line RU is connected to all four of the "and" gates at the reset inputs of all four in-use flip-flops 26. The outputs 205 from in-use flip-flops 26 are connected to idle set selector 50 shown in FIG. 1. The selection inputs $s_1$ and $s_2$ to second gates 17 are connected through an "or" gate 206 having an output $a$ which is connected to all of the "and" gates in FIG. 3.

The second gates 18 shown in FIG. 1 may be arranged and connected between processor 12 and flip-flops 25 and 26 in the same way as second gates 17 are connected between processor 11 and the flip-flops 25 and 26 in FIG. 3. The outputs of the second gates 18 are connected to the set and reset inputs of flip-flops 25 and 26 in the same way as the outputs of second gates 17 are connected to the same set and reset inputs of flip-flops 25 and 26.

Figure 4:
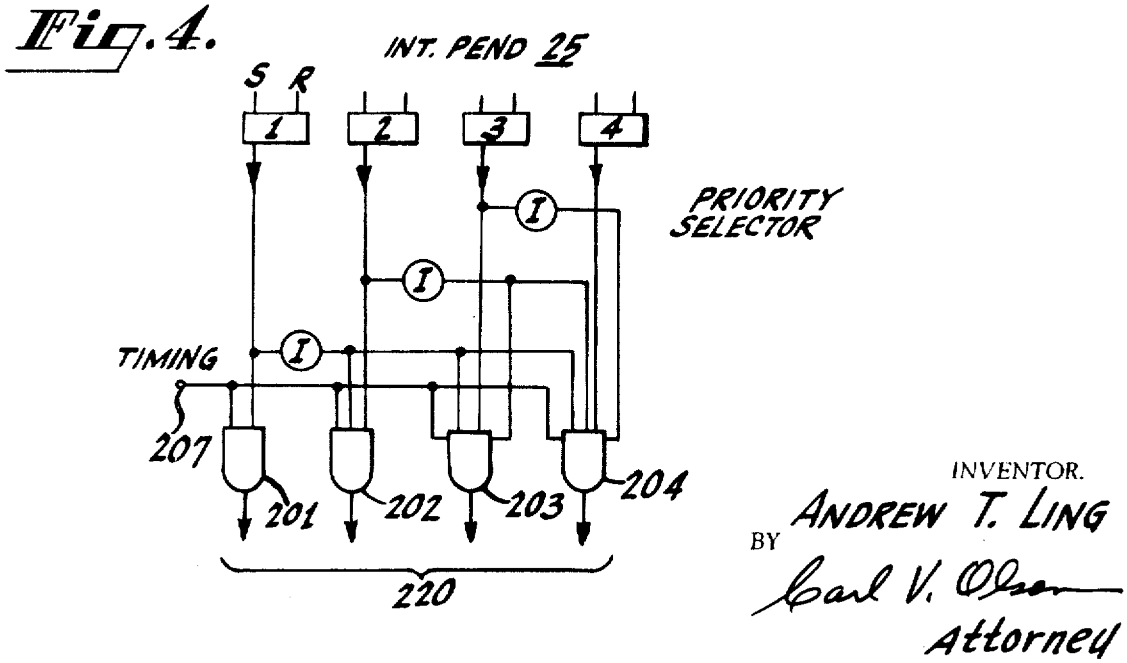
FIG. 4 is a diagram of a priority selector useful in the system of FIG. 1.

The interrupt set selector 20 shown in FIG. 1 may be a simple priority selector of the type shown in FIG. 4. FIG. 4 shows four interrupt pending flip-flops 25 having outputs coupled to four respective "and" gates 201, 202, 203 and 204. The output of the first flip-flop is also connected through an inverter to disable gates 202, 203 and 204. The outputs of the second and third flip-flops are similarly connected through inverters to disable higher-numbered gates 203 and 204. The priority selector of FIG. 4 operates on the occurrence of a timing pulse at terminal 207 to provide an output at 220 from the highest priority one (the lowest-numbered one) of the interrupt pending flip-flops providing outputs. The outputs 220 (in FIG. 4) from selector 20 (in FIG. 1) may be conveyed through four wires, through four gates 32, through four gates 38 and through four wires back to the register PSR. Single wires and gates are shown in FIG. 1 to avoid unnecessary complexity in the drawing illustrating the system.

The other selectors 10, 30, 40 and 50 shown in FIG. 1 may similarly be constructed as priority selectors of the type shown in FIG. 4. The selectors 10 and 40 (in the system example of FIG. 1 showing two processors) differ from the arrangement shown in FIG. 4 in that the selectors each have only two inputs and two outputs. The idle set selector 50 may include the priority selector of FIG. 4 and in addition, a conventional comparator having an output conditionally providing the previously described advance pulse ADV on line 51. Or, the selector 50 may consist of a comparator only. According to an alternative arrangement different from the arrangement illustrated in FIG. 1, the idle set selector 50 may include merely a priority selector as shown in FIG. 4. In this case, program set register numbers PSRN are not supplied to the selector 50, and the output of the selector 50 is a number which is inserted directly into the register PSR in the same way that a number is inserted from selectors 20 and 30.

Figure 2:
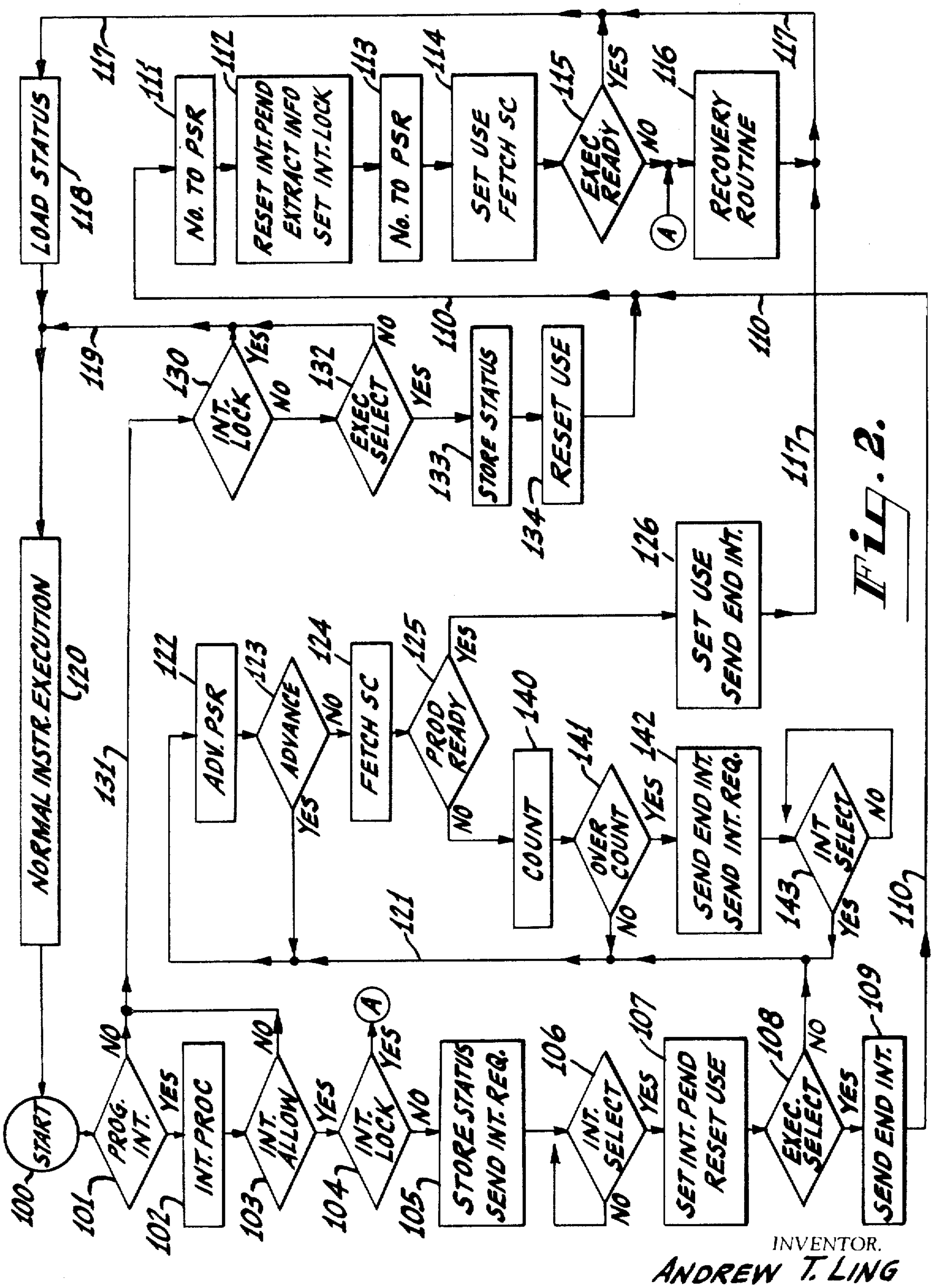
FIG. 2 is a flow chart which will be referred to in describing the operation of the computer system of FIG. 1.

Reference is now made to FIG. 2 for a description of the operation of the processor 11 in relation to the controller in the computer system shown in FIG. 1. FIG. 2 is a flow chart which will be referred to in describing a routine followed by processor 11 in effecting its sequential performance of parts of a number of executive programs and/or user production programs. Processor 12 also independently follows the flow chart in the same way. The routine illustrated in FIG. 2 may be implemented in the processor by "hardware," i.e., by wired logic, or "software," i.e., programing, and it is a routine followed by the processor whenever it reaches an interruptable point, designated 100, in the program it is executing. It will be assumed, by way of example, that processor 11 is presently executing a production program using the set 21 of program execution registers.

The decision point 101 in FIG. 2 represents the checking by the processor of its program interrupt flags to determine whether a program interrupt is required. If a program interrupt is called for, 102 is entered to perform the necessary interrupt processing, which may include updating the interrupt flag and examining the interrupt mask, both located in the one set 21 of program execution registers 21 through 24 presently connected with the processor. If the interupt is allowed at the decision point 103, a check is made at 104 to determine whether an interrupt is barred by the interrupt lock flip-flop in the processor. If there is no interrupt lock, 105 is entered to store status information in the set 21 of program execution registers presently connected to the processor, and to send an interrupt request signal INT REQ to the interrupted processor selector 10 in FIG. 1. When selector 10 honors the interrupt request, it issues a select signal $s_1$. The processor responds at point 106 by proceeding to 107 to issue a set interrupt pending signal INT to the one interrupt pending indicator flip-flop 1 of the group 25 identified by the contents of the processor's register PSR, and to issue a reset in-use signal USE to the identified in-use indicator flip-flop 1 in the group 26.

Following 107, a decision is made by the controller whether the processor being serviced is to be selected to perform an executive program. If the processor 11 is tentativly selected by the selector 40, selector 40 issues a selection signal $t_1$, and if there is an interrupt pending indicated by any of the interrupt pending flip-flops 25, the "or" gate 27 transmits an EXEC SEL signal through gate 29 (enabled by $t_1$) to processor 11. The processor recognizes at 108 that it is selected to do an executive program, and at 109 it issues an end interrupt signal END INT through gate 41 to the interrupted processor selector 10 to discontinue the output $s_1$ from the interrupted processor selector 10.

The flow of the routine proceeds over path 110 to 111 at which point the program set register PSR in the processor receives an identifying number through gates 32 and 38 from interrupted set selector 20. The number received is a number or address identifying the selected one of the four sets of program execution registers which has an interrupt pending. It will be assumed that set 22 of program execution register had an interrupt pending and is selected. The new number PSRN of set 22 in the program set identifying register PSR is applied to 1st gates 15, which connect the processor 11 over data and controls lines 13 with the identified set 22 of the sets of registers 21 through 24.

At 112 the processor issues a reset interrupt pending signal over line INT and through 2nd gates 17 to the identified one, flip-flop 2, of the interrupt pending indicators 25. This is done to record the fact that the interrupt is being taken care of and is no longer pending. The processor extracts all the information over lines 13 from the identified set 22 of registers that will be needed in performing the required executive program, and it sets its interrupt lock flip-flop to prevent being interrupted during performance of the executive program.

At 113 the program register PSR in the processor receives a new identifying number through gates 34 and 38 from the executive set selector 30. The new number received is a number identifying the set of executive program execution registers that will be used to process the interrupt that was pending in the set of registers 22. The new number PSRN, which is assumed to be the number of the set 24 of executive program execution registers, is applied from register PSR to 1st gates 15 to connect the processor over bus 13 with the identified set 24 of executive program execution registers. At point 114 in the flow chart, the number PSRN of set 24 also conditions 2nd gates 17 for coupling a set use signal over line USE to the in-use indicator 4 in the group of in-use indicators 26. The processor then fetches the contents of a system control register SC included in the addressed set 24 of registers. The register SC contains information describing the program which the set 24 of registers is concerned with.

The processor at 115 makes a check of the contents of register SC to make sure that the program of set 24 is a suitable executive program. If not, 116 is entered to perform an abnormal-condition or error-recovery routine. If so, the path 117 is followed to 118 at which point the contents of status registers in the set 24 of executive program execution registers are transferred over bus 13 to registers (not shown) in the processor 11. The processor then, at 120, performs its normal instruction execution steps in executing an instruction having an address in main memory derived from the set 24 of registers. Following instructions in the executive program are executed in sequence because the interrupt lock flip-flop in the processor is set and the flow repeatedly circles the loop including paths 131 and 119.

The path through the flow chart of FIG. 2 which has been described is a path taken when (1) the processor has generated and recorded an interrupt condition while executing a program with the aid of set 21 of program execution registers, (2) the processor is then chosen at 108 to service an interrupt pending in a program assigned to set 22 of program execution registers, from which the processor obtains information needed to handle the interrupt, and (3) the processor performs the executive routine required by the interrupt with the aid of the set 24 of executive program execution registers.

If the processor is not chosen at 108 by the executive processor selector 40 and the executive selection circuitry to do an executive program, a second course is taken through the flow chart which proceeds along path 121 to 122 at which point the identifying number in the program set register PSR is incremented. The incrementing is accomplished with the aid of the idle set selector 50 which continues to send advance signals ADV through gate 52 to the register PSR in the processor so long as a comparison at 123 shows that the number PSRN corresponds with a set of registers which are already in use.

At 124 the processor fetches the contents of the system control register SC from the addressed set of program execution registers, and if a ready production program is described, this fact is recognized at 125. At 126 the processor sends a set in-use signal USE through 2nd gates 17 to the in-use indicator 26 identified by program set number PSRN. The processor then sends an end interrupt signal END INT through gate 41 to discontinue the selection output $s_1$ from interrupt processor selector 10. The flow path 117 is then followed to 118 to transfer the status information from the identified set of production program execution registers to the processor. The normal instruction execution is then performed at 120.

A third path is taken if there is no program interrupt at 101, or, an interrupt is not allowed at 103, and there is an interrupt lock at 130. Under these conditions, the processor returns to normal instruction execution at 120 of the program it was performing.

The remaining short-loop paths in the flow chart of FIG. 2 are provided to keep the processor usefully occupied when it is blocked from following any one of the three paths already described. In case there is no interrupt lock at 130, the processor checks at 132 to see if it is to be interrupted for the handling of an executive program. If so, the processor at 133 returns status information to the control register in the set of program execution registers it has been using, and at 134 the processor resets the identified in-use indicator 26. Thereafter the processor follows path 110 to the executive program branch of the flow chart which has been described.

A remaining short-loop branching path is followed from 125 through counter 140, count detector 141 and path 121 to advance the register PSR if the contents of the system control register SC does not describe a suitable production program. If no suitable program is found within a time determined by count detector 141, the processor at 142 sends an end interrupt signal END INT and an interrupt request signal INT REQ to make itself available at 143 during a following cycle of the controller for selection and assignment.

An escape path A is provided from 104 to 116 to recover from an abnormal condition in which a processor performing an executive program encounters a program interrupt condition.

The two processors 11 and 12 shown in the computer system of FIG. 1 may be constructed to be identical. On the other hand, the processors may be constructed so that processor 11 is particularly economical and effective in performing executive programs and processor 12 is particularly economical and effective in performing users' production programs. In this case the executive processor selector 40 is constructed to always select processor 11 unless processor 11 is not available due to being inoperative or turned off. When processor 11 is inoperative, processor 12 is selected to perform both executive and production programs, although it may be less efficient than processor 11 in performing executive programs. Likewise, if processor 12 is inoperative, processor 11 may be selected to perform executive programs, and also production programs at reduced efficiency. In this way the computer system can operate most efficiently under normal conditions and continue to operate at reduced efficiency should one processor fail.

What is claimed is:

1. A multi-processor multi-programed computer system, comprising a plurality of computer processors all having access to a main memory, a plurality of sets of program execution registers for a respective plurality of programs including a user's production program, and an executive program, a program-set-identifying register associated with each computer processor, a controller means responsive to availability signals from a processor and said sets of program execution registers and operative to insert a number identifying an available set of program execution registers into the program-set-identifying register associated with a respective processor, and gates responsive to the contents of the program-set-identifying register associated with each processor to connect the corresponding computer processor with an identified set of program execution registers.

2. A multi-processor multi-programed computer system, comprising a plurality of computer processors, a plurality of sets of program execution registers for production and executive programs, gate means to connect the processors to any different ones of said sets of program execution registers, a first selector operating in response to a program-interrupt request from a processor to select the processor and make it available for another program,
a second selector for selecting the highest-priority set of production program execution registers having an interrupt pending,
a third selector for selecting an available set of executive program execution registers,
a fourth selector for selecting an available processor and connecting it with a set of program execution registers selected by said second or third selectors, and
a fifth selector for connecting a processor not selected by said fourth selector to a selected idle set of production program execution registers.

3. A multi-processor multi-programed computer system comprising
a plurality of computer processors,
a plurality of sets of program execution registers for production and executive programs,
a program-set-identifying register associated with each processor to control the connection of the respective processor with an identified set of program execution registers,
a first interrupted processor selector operating in response to a program-interrupt request from a processor to select the processor and make it available for another program,
a second selector for generating the address of the highest-priority set of production program execution registers having an interrupt pending,
a third selector for generating the address of an available set of executive program execution registers,
a fourth executive processor selector for selecting an available processor and conditionally directing addresses from said second or third selectors to the program-set-identifying register associated with the selected processor, and
a fifth selector operative when a processor not selected by said fourth selector for selecting and directing the address of an idle set of production program execution registers to the program-set-identifying register associated with the processor.

4. A multi-processor multi-programed computer system, comprising
a plurality of computer processors all having access to a main memory and each including an interrupt facility,
a plurality of sets of program execution registers for a respective plurality of programs including a user's production program and an executive program,
a program-set-identifying register associated with each processor,
first gates responsive to the contents of the program-set-identifying register associated with each processor to operationally connect the processor with the identified set of program execution registers,
an interrupt-pending indicator and an in-use indicator for each set of program execution registers,
second gates controlled by the contents of the program-set-identifying registers associated with each processor for coupling signals from each processor to thereby-identified ones of the interrupt-pending and in-use indicators,
a first selector for selecting a processor in response to a program-interrupt request from the processor, the first selector being operative to permit the selected processor to discontinue operating with the set of program execution registers then connected therewith, and to update the corresponding interrupt-pending and in-use indicators, and to issue an "available" signal,
a second selector responsive to the contents of said interrupt-pending indicators for generating the address of the highest-priority set of program execution registers having an interrupt pending,
a third selector for selecting and generating the address of an available set of executive program execution registers,
a fourth selector for selecting or not selecting a processor to operate as an executive processor, said fourth selector being operative to select a processor in response to the coincidence of an "available" signal from a processor having a predetermined priority for selection, and an output from any interrupt-pending indicator, said fourth selector being operative to permit a selected processor to end its program interrupt status, to transfer the address from said second selector to the program-set-identifying register associated with the processor, to update the corresponding interrupt-pending and in-use indicators, to extract needed information from the set of program execution registers selected by said second selector, and to then transfer the address from said third selector to the program-set-identifying register associated with the processor, whereby the selected processor is permitted to proceed with the performance of the executive program, and
a fifth selector, operative in the event that a processor is not selected by said fourth selector, for comparing the contents of the in-use indicators, with the contents of the program-set-identifying register associated with a processor, and operative to insert the identifying address of an idle set of program execution registers into the program-set-identifying register associated with the processor, whereby the processor is permitted to proceed with the performance of a user's production program.

References Cited

UNITED STATES PATENTS

| | | | |
|---|---|---|---|
| 3,242,467 | 3/1966 | Lamy | 340—172.5 |
| 3,309,672 | 3/1967 | Brun et al. | 340—172.5 |
| 3,312,951 | 4/1967 | Hertz | 340—172.5 |
| 3,348,210 | 10/1967 | Ochsner | 340—172.5 |
| 3,373,408 | 3/1968 | Ling | 340—172.5 |

PAUL J. HENON, Primary Examiner

P. R. WOODS, Assistant Examiner